United States Patent
Mendahawi

(10) Patent No.: US 9,986,499 B1
(45) Date of Patent: May 29, 2018

(54) LOCATION-BASED DETERMINATION OF CHANNEL FOR INITIATING PEER-TO-PEER SESSION

(71) Applicant: Microsoft Technology Licensing, LLC, Redmond, WA (US)

(72) Inventor: Nayef Mendahawi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

(21) Appl. No.: 15/345,502

(22) Filed: Nov. 7, 2016

(51) Int. Cl.
*H04W 72/00* (2009.01)
*H04W 48/18* (2009.01)
*H04W 76/02* (2009.01)
*H04W 64/00* (2009.01)
H04W 74/00 (2009.01)
H04W 84/18 (2009.01)
H04W 84/12 (2009.01)

(52) U.S. Cl.
CPC ........... *H04W 48/18* (2013.01); *H04W 64/00* (2013.01); *H04W 76/02* (2013.01); *H04W 84/12* (2013.01); *H04W 84/18* (2013.01)

(58) Field of Classification Search
CPC .. H04W 76/023; H04W 76/043; H04W 4/008
USPC ....................................................... 455/454
See application file for complete search history.

(56) References Cited

U.S. PATENT DOCUMENTS

| 5,771,454 A * | 6/1998 | Ohsawa ................ H04W 16/04 455/449 |
| 9,306,992 B2 | 4/2016 | Praveenkumar et al. |
| 2007/0287451 A1 * | 12/2007 | Seo ........................ H04H 20/26 455/434 |
| 2011/0051677 A1 * | 3/2011 | Jetcheva ........... H04W 72/0486 370/329 |
| 2012/0201139 A1 | 8/2012 | Wiley et al. |
| 2014/0232618 A1 | 8/2014 | Perrin et al. |
| 2014/0365611 A1 | 12/2014 | Praveenkumar et al. |
| 2015/0095510 A1 | 4/2015 | Bhorkar et al. |
| 2015/0103680 A1 | 4/2015 | Anand et al. |
| 2015/0133079 A1 | 5/2015 | Smith et al. |
| 2015/0139115 A1 * | 5/2015 | Seok ................. H04W 72/0453 370/329 |
| 2015/0172757 A1 | 6/2015 | Kafle et al. |
| 2015/0351018 A1 | 12/2015 | Kim et al. |

(Continued)

FOREIGN PATENT DOCUMENTS

CN            103702436 A     4/2014

OTHER PUBLICATIONS

Sitorus, et al., "Establishment of Wi-Fi Display Session between Source and Sink Device in Wireless Android Screencasting", In Proceedings of International Symposium on Intelligent Signal Processing and Communication Systems, Nov. 9, 2015, pp. 663-668.

(Continued)

*Primary Examiner* — Lee Nguyen
(74) *Attorney, Agent, or Firm* — Wade IP Law LLC

(57) ABSTRACT

Techniques are described herein that are capable of performing a location-based determination of a channel for initiating a peer-to-peer session. For instance, a channel associated with a wireless technology at a location may be selected to initiate a peer-to-peer session at the location so that turning on the wireless technology after the peer-to-peer session is initiated does not cause the channel to be changed.

20 Claims, 7 Drawing Sheets

(56) References Cited

U.S. PATENT DOCUMENTS

| | | |
|---|---|---|
| 2016/0134929 A1 | 5/2016 | Robii et al. |
| 2016/0179295 A1 | 6/2016 | Liang et al. |
| 2016/0182929 A1 | 6/2016 | Ortiz et al. |
| 2016/0183317 A1 | 6/2016 | Shao et al. |
| 2016/0196097 A1 | 7/2016 | Gao et al. |

OTHER PUBLICATIONS

"Device.Network.WLAN", Retrieved on: Aug. 11, 2016, 25 pages, Available at: https://msdn.microsoft.cornien-us/windows/hardware/commercialize/design/compatibility/device-network-wlan.

* cited by examiner

LOCATION-BASED DETERMINATION OF CHANNEL FOR INITIATING PEER-TO-PEER SESSION

BACKGROUND

Peer-to-peer technology enables interconnected devices (a.k.a. peers) to share resources without a centralized administrative system. Miracast® which is developed by Wifi-Alliance, MiracleCast™ which is developed by Black Duck Software, Inc., and AirPlay® which is developed by Apple Inc. are example peer-to-peer technologies that enable a source device to wirelessly transfer data (e.g., streaming video data) to a sink device. For example, the source device may be a device that has a relatively small display screen (e.g., a tablet computer or a personal digital assistant), and the sink device may be a device that has a relatively large display screen (e.g., a television or an interactive whiteboard). A user may wish to transfer video data from the source device to the sink device to facilitate sharing video images that are represented by the video data with other people who are in the presence of the user.

SUMMARY

Various approaches are described herein for, among other things, performing a location-based determination of a channel for initiating a peer-to-peer session. For instance, a channel associated with a wireless technology at a location may be selected to initiate a peer-to-peer session at the location so that turning on the wireless technology after the peer-to-peer session is initiated does not cause the channel to be changed. A peer-to-peer session is a session between a source device and a sink device in which one or more portions of a user-identified data stream are provided from the source device to the sink device in accordance with a peer-to-peer protocol and in which all portions of the user-identified data stream that are provided from the source device to the sink device are provided. The peer-to-peer session includes one or more peer-to-peer connections between the source device and the sink device. Each peer-to-peer connection corresponds to a respective channel via which at least a portion of the data stream is provided from the source device to the sink device. Each channel corresponds to a respective sink in the sink device. For instance, the peer-to-peer session may include a first peer-to-peer connection via which the source device provides a first portion of the data stream to a first sink in the sink device; the peer-to-peer session may include a second peer-to-peer connection via which the source device provides a second portion of the data stream to a second sink in the sink device, and so on.

In a first example approach, a designated wireless technology profile is identified from multiple wireless technology profiles to use at a designated location. A designated channel is selected from multiple available channels based at least in part on the designated wireless technology profile indicating that the designated channel is associated with a wireless technology. A peer-to-peer session, which corresponds to a peer-to-peer technology that is different from the wireless technology, is initiated using the designated channel.

In a second example approach, a location of a source device is determined. A profile associated with a wireless technology is reviewed to determine a designated channel that the wireless technology is to use at the location. A request to initiate a peer-to-peer session is received. The peer-to-peer session corresponds to a peer-to-peer technology that is different from the wireless technology. The source device is caused to initiate the peer-to-peer session using the designated channel based at least in part on a determination that the wireless technology is to use the designated channel at the location.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the disclosed technologies are not limited to the specific implementations described in the Detailed Description and/or other sections of this document. Such implementations are presented herein for illustrative purposes only. Additional implementations will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate implementations of the disclosed technologies and, together with the description, further serve to explain the principles involved and to enable a person skilled in the relevant art(s) to make and use the disclosed technologies.

Figure 1:
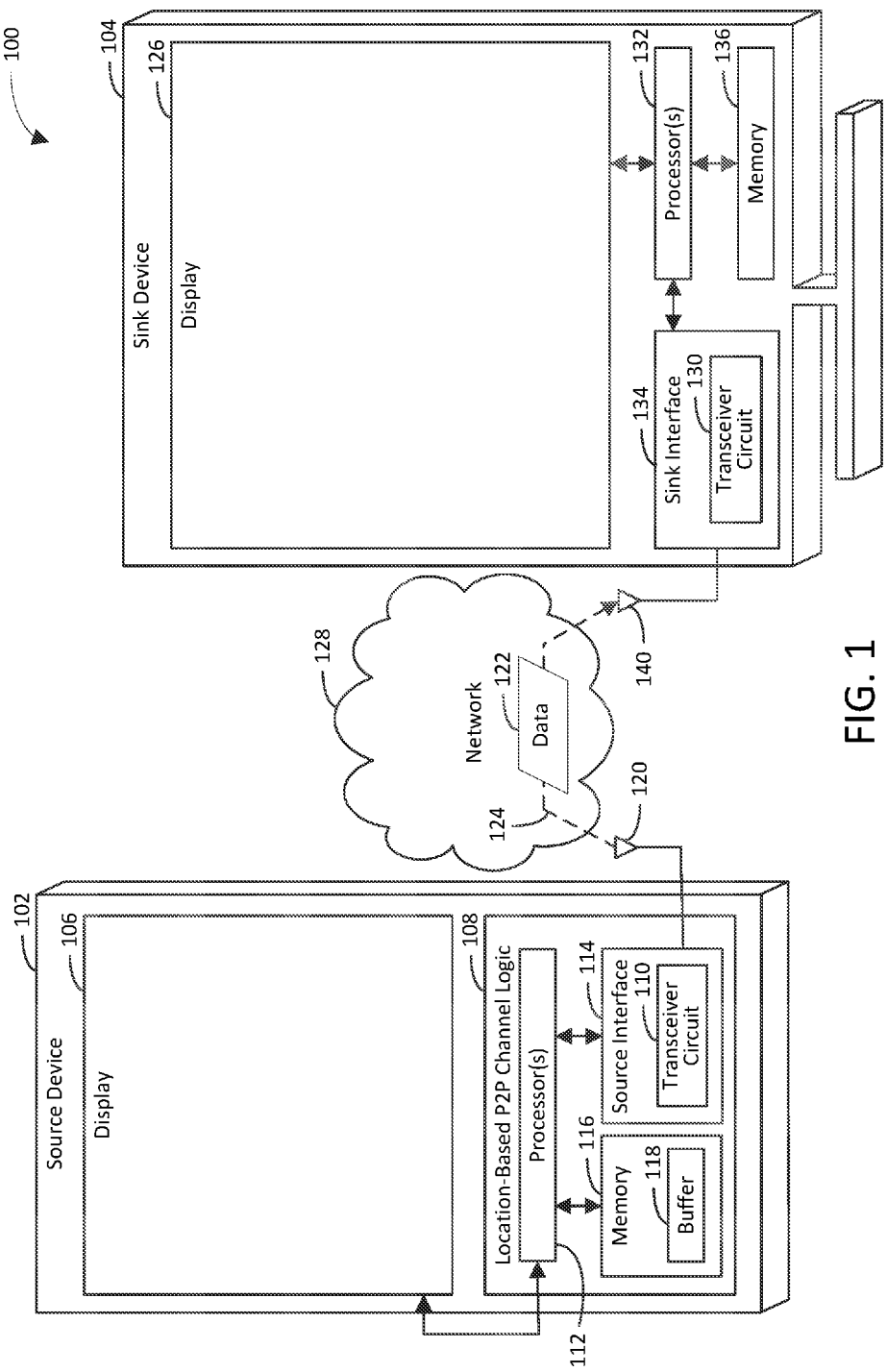
FIG. 1 is a block diagram of an example location-based peer-to-peer channel system.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate examples and implementations of the disclosed technologies. However, the scope of the present disclosure is not limited to these examples and implementations, but is instead defined by the appended claims. Thus, examples and implementations beyond those shown in the accompanying drawings, such as modified versions of the illustrated examples and implementations, may nevertheless be encompassed by the present disclosure.

References in the specification to "one implementation," "an implementation," "an example implementation," or the like, indicate that the implementation described may include a particular feature, structure, or characteristic, but every implementation may not necessarily include the particular feature, structure, or characteristic. Moreover, such phrases are not necessarily referring to the same implementation. Furthermore, when a particular feature, structure, or characteristic is described in connection with an implementation, it is submitted that it is within the knowledge of one skilled in the relevant art(s) to implement such feature, structure, or characteristic in connection with other implementations whether or not explicitly described.

II. Example Implementations

Example implementations described herein are capable of performing a location-based determination of a channel for initiating a peer-to-peer session. For instance, a channel associated with a wireless technology at a location may be selected to initiate a peer-to-peer session at the location so that turning on the wireless technology after the peer-to-peer session is initiated does not cause the channel to be changed. A peer-to-peer session is a session between a source device and a sink device in which one or more portions of a user-identified data stream are provided from the source device to the sink device in accordance with a peer-to-peer protocol and in which all portions of the user-identified data stream that are provided from the source device to the sink device are provided. The peer-to-peer session includes one or more peer-to-peer connections between the source device and the sink device. Each peer-to-peer connection corresponds to a respective channel via which at least a portion of the data stream is provided from the source device to the sink device. Each channel corresponds to a respective sink in the sink device. For instance, the peer-to-peer session may include a first peer-to-peer connection via which the source device provides a first portion of the data stream to a first sink in the sink device; the peer-to-peer session may include a second peer-to-peer connection via which the source device provides a second portion of the data stream to a second sink in the sink device, and so on.

In contrast to the example implementations described herein, when a conventional source device utilizes a peer-to-peer technology, the source device typically provides data to a sink device using a pre-determined default channel that is associated with peer-to-peer technology. If a user of the source device subsequently turns on a wireless technology (e.g., WiFi, cellular, or global positioning system (GPS)) that is different from the peer-to-peer technology, the source device traditionally stops sending the data via the default channel and sends the rest of the data via the channel that is associated with the wireless technology. Accordingly, the source device may disconnect the peer-to-peer connection associated with the default channel and establish another peer-to-peer connection using the channel associated with the different wireless technology to provide the rest of the data, which was not transferred using the default channel. The source device may switch channels in this manner for any of a variety of reasons, such as because a wireless chipset that is included in the source device is not capable of handling multiple channels and/or because the wireless technology has a higher priority than the peer-to-peer technology.

Switching channels during a data transfer, as described above, may negatively affect a user experience associated with the data transfer. For instance, a portion of the data corresponding to the time period over which the source device switches from the default channel to the channel that is associated with the wireless technology may be lost. Loss of such data may result in video that has poor image quality and/or that includes gaps.

Example techniques described herein have a variety of benefits as compared to conventional techniques for determining a channel to initiate a peer-to-peer session. For instance, the example techniques may be capable of initiating a peer-to-peer session using a channel that is selected to be used by a wireless technology (e.g., at a location of the source device that initiates the peer-to-peer session) that is different from the peer-to-peer technology. The example techniques may be capable of maintaining a single peer-to-peer connection (i.e., using a single channel) for an entirety of the peer-to-peer session. The example techniques may improve a user experience associated with the peer-to-peer session. For instance, the example techniques may mitigate (e.g., prevent) loss of data and/or gaps in video during the peer-to-peer session. The example techniques may provide video having a greater image quality than conventional techniques.

The example techniques may reduce an amount of time and/or resources (e.g., processor, memory, network bandwidth) that are consumed to stream data during a peer-to-peer session. The example techniques may increase efficiency of a computing device (e.g., source device) that is used to stream data during a peer-to-peer session. The example techniques may increase user efficiency (e.g., by reducing a number of steps that a user takes to receive a data stream). For instance, the example techniques may reduce (e.g., eliminate) the steps that a user would typically perform to obtain data that is lost during channel switching.

FIG. 1 is a block diagram of an example location-based peer-to-peer channel system 100. Generally, location-based peer-to-peer channel system 100 operates to transfer data using a peer-to-peer protocol. Examples of a peer-to-peer protocol include but are not limited to a Miracast® protocol, a MiracleCast™ protocol, and an AirPlay® protocol. For instance, the peer-to-peer protocol may employ the Wi-Fi Direct® standard developed by Wi-Fi Alliance. The Wi-Fi Direct® standard enables devices to connect with each other without a dedicated wireless access point (WAP). In accordance with example implementations described herein, location-based peer-to-peer channel system 100 performs a location-based determination of a channel for initiating a peer-to-peer session (e.g., in which the aforementioned data is to be transferred). The data that is transferred using the peer-to-peer protocol is described herein to be streaming video data for purposes of illustration, though it will be recognized that the data may be any suitable type of data. For instance, the data may include documents, including but not limited to Web pages, images, audio files, video files, etc.

As shown in FIG. 1, the location-based peer-to-peer channel system 100 includes a source device 102 and a sink device 104. Communication between the source device 102 and the sink device 104 is carried out over a network 128 using well-known network communication protocol(s). The network 128 may be a wide-area network (e.g., the Internet), a local area network (LAN), another type of network, or a combination thereof. For instance, communication in accordance with the peer-to-peer protocol may be performed using a wireless LAN network.

The source device 102 is a processing system that is capable of providing (e.g., streaming) data 122 (e.g., video data) to sink device 104 via one or more channels (e.g., channel 124). An example of a processing system is a system that includes at least one processor that is capable of manipulating data in accordance with a set of instructions. For instance, a processing system may be a computer (e.g., a tablet computer; a laptop computer; a desktop computer; or a wearable computer, such as a smart watch or a head-mounted computer), a personal digital assistant, or a cellular telephone.

The source device 102 includes a display 106 and location-based peer-to-peer (P2P) channel logic 108. The display 106 is configured to display images that are represented by data (e.g., data 122), which may be stored in memory 116. The display 106 may be a touch screen, though the scope of the example implementations is not limited in this respect. For instance, the display 106 may include touch and/or hover functionality. Touch functionality enables display 106 to sense objects that physically touch the display 106. Hover functionality enables display 106 to sense objects that are placed proximate the display 106 (e.g., a spaced distance from the display 106 and/or without touching the display 106).

The location-based peer-to-peer channel logic 108 is configured to establish a peer-to-peer session between the source device 102 and the sink device 104. In example implementations described herein, the location-based peer-to-peer channel logic 108 is configured to initiate the peer-to-peer session using a channel 124 that is determined based on (e.g., based at least in part on) a location of the source device 102. The location-based peer-to-peer channel logic 108 includes processor(s) 112, a source interface 114, and memory 116.

The processor(s) 112 are capable of performing operations based on instructions (e.g., computer readable instructions) that are stored in the memory 116 (e.g., in response to receipt of input from a user via user interface(s) such as display 106). For instance, the processor(s) 112 may perform operations to establish a peer-to-peer session between the source device 102 and the sink device 104. In accordance with example implementations described herein, the processor(s) 112 initiate a peer-to-peer session between the source device 102 and the sink device 104 using the channel 124 based at least in part on the channel 124 being associated with a wireless technology that is different from the peer-to-peer technology with which the peer-to-peer session is established. For instance, the wireless technology may be a WiFi, cellular, or global positioning system (GPS) technology. Examples of a cellular technology include but are not limited to long-term evolution (LTE), universal mobile telecommunications system (UMTS), general packet radio service (GPRS), and global system for mobile communications (GSM) technologies.

In one example implementation, the processor(s) 112 identify a designated wireless technology profile from multiple wireless technology profiles to use at a designated location (e.g., a location of the source device 102). The wireless technology profiles may correspond to respective locations. Examples of a location include but are not limited to a user's home, a user's workplace, or a building (or a level or a room thereof). In further accordance with this implementation, the processor(s) 112 select the channel 124 from multiple available channels based at least in part on the designated wireless technology profile indicating that the channel 124 is associated with a wireless technology. In further accordance with this implementation, the processor(s) 112 initiate a peer-to-peer session, which corresponds to a peer-to-peer technology that is different from the wireless technology, using the channel 124.

In a second example implementation, the processor(s) 112 determine a location of the source device 102. In accordance with this implementation, the processor(s) 112 review a profile associated with a wireless technology to determine the channel 124 that the wireless technology is to use at the location. In further accordance with this implementation, the processor(s) 112 receive a request to initiate a peer-to-peer session, which corresponds to a peer-to-peer technology that is different from the wireless technology. For instance, the request may be received via a user interface, such as the display 106. In further accordance with this implementation, the processor(s) 112 cause the source device 102 to initiate the peer-to-peer session using the channel 124 based at least in part on a determination that the wireless technology is to use the channel 124 at the location.

The memory 116 is configured to store instructions (e.g., computer-readable instructions) that are executable by the processor(s) 112 to perform operations. The memory 116 may include any suitable type of memory, including but not limited to read only memory (ROM), random access memory (RAM), or flash memory. The memory 116 is further configured to store wireless technology profiles for the various wireless technologies that the source device 102 is enabled to use. The memory 116 is further configured to store cross-reference information that cross-references locations with the wireless technology profiles. For instance, the cross-reference information may indicate that when WiFi technology is utilized, a first WiFi profile is to be used when the source device 102 is at a first location; a second WiFi profile is to be used when the source device 102 is at a second location, and so on. The cross-reference information may further indicate that when GPS technology is utilized, a first GPS profile is to be used when the source device 102 is at the first location; a second GPS profile is to be used when the source device 102 is at the second location, and so on. The cross-reference information may cross-reference any suitable locations with any suitable wireless technology profiles in addition to or in lieu of any one or more of those mentioned above.

Each of the wireless technologies may be associated with a respective location determination technique. For instance, the processor(s) 112 may determine the location of the source device 102 using a first technique for WiFi, using a second technique that is different from the first technique for GPS, and so on.

The memory 116 is shown to include a buffer 118 for illustrative purposes. The buffer 118 buffers (e.g., temporarily stores) the data 122 that is to be provided to the sink device 104 via the channel 124. The data 122 may be configured as packets, for example. The buffer 118 may compensate for a difference between a rate at which the data 122 is received at the buffer 118 and the rate at which the data 122 is processed by the sink device 104.

The source interface 114 is configured to transmit and receive data via the channel 124 in accordance with the peer-to-peer protocol. The source interface 114 is shown to include a transceiver circuit 110 for illustrative purposes. The transceiver circuit 110 is configured to transmit the data 122 through the channel 124 using an antenna 120.

The sink device 104 is a processing system that is capable of receiving data (e.g., data 122) from the source device 102 via channel(s) (e.g., channel 124). For instance, the sink device 104 may be a television or an interactive whiteboard.

The sink device 104 includes a display 126, processor(s) 132, a sink interface 134, and memory 136. The display 126 is operable in a manner similar to the display 106 described above with reference to the source device 102. The display 126 is shown to be included in the sink device 104 for illustrative purposes and is not intended to be limiting. For example, the display 126 may be external to the sink device 104. In accordance with this example, the sink device 104 may be an audio/visual (A/V) receiver to which the display 126 is coupled via an HDMI cable.

The processor(s) 132 are capable of performing operations based on instructions that are stored in the memory 136. For instance, the processor(s) 132 may perform operations to cause images that are represented by the data 122 to be displayed by the display 126. The processor(s) 132 may perform operations to execute a peer-to-peer application that is stored in the memory 136, though the scope of the example implementations is not limited in this respect. For instance, execution of the peer-to-peer application may cause the sink device 104 to be compatible with the peer-to-peer protocol (e.g., to interact with the source device 102 in accordance with the peer-to-peer protocol).

The memory 136 is configured to store information, such as the aforementioned peer-to-peer application and the data 122.

The sink interface 134 is configured to transmit and receive data via the channel 124 in accordance with the peer-to-peer protocol. The sink interface 134 is shown to include a transceiver circuit 130 for illustrative purposes. The transceiver circuit 130 is configured to receive the data 122 through the channel 124 using an antenna 140.

It will be recognized that the location-based peer-to-peer channel system 100 may not include one or more of the display 106, the location-based peer-to-peer channel logic 108, the transceiver circuit 110, the processor(s) 112, the source interface 114, the memory 116, the buffer 118, display 126, the transceiver 130, the processor(s) 132, the sink interface 134, and/or the memory 136. Furthermore, the location-based peer-to-peer channel system 100 may include components in addition to or in lieu of the display 106, the location-based peer-to-peer channel logic 108, the transceiver circuit 110, the processor(s) 112, the source interface 114, the memory 116, the buffer 118, display 126, the transceiver 130, the processor(s) 132, the sink interface 134, and/or the memory 136.

Example techniques for performing a location-based determination of a channel for initiating a peer-to-peer session are discussed in greater detail below with reference to FIGS. 2-5.

Figure 2:
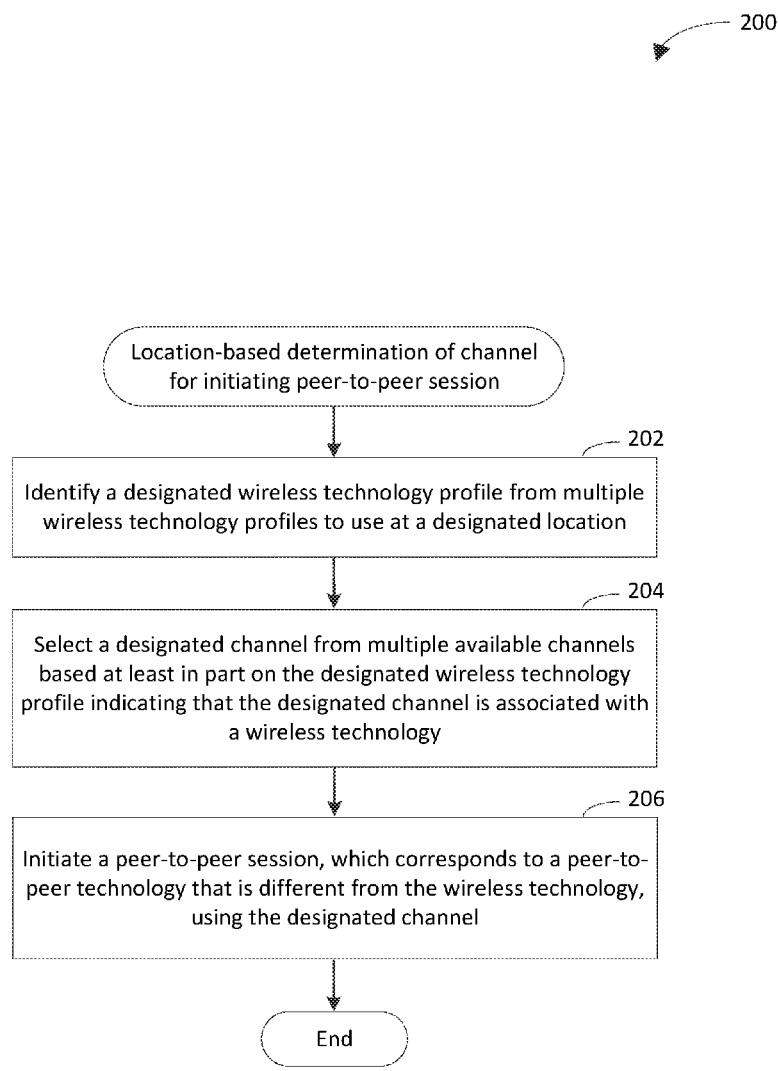
FIGS. 2 and 4 depict flowcharts of example methods for performing a location-based determination of a channel for initiating a peer-to-peer session.
Figure 3:
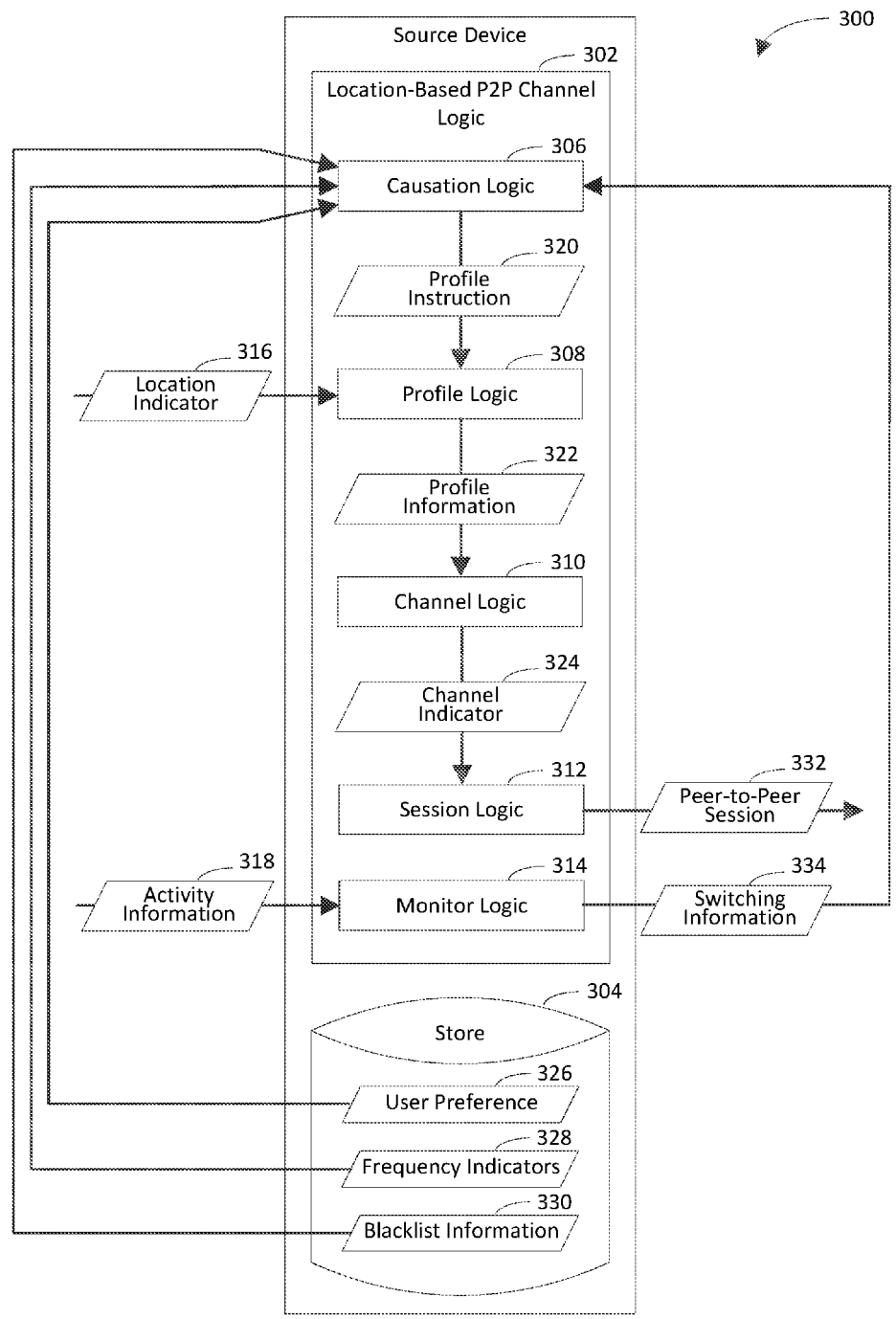
FIGS. 3 and 5 are block diagrams of example implementations of a source device shown in FIG. 1.

FIG. 2 depicts a flowchart 200 of an example method for performing a location-based determination of a channel for initiating a peer-to-peer session. Flowchart 200 may be performed by location-based peer-to-peer channel logic 108 shown in FIG. 1, for example. For illustrative purposes, flowchart 200 is described with respect to source device 300 shown in FIG. 3. Source device 300 includes location-based peer-to-peer channel logic 302, which is an example of location-based peer-to-peer channel logic 108, according to an implementation. As shown in FIG. 3, source device 300 further includes a store 304. Store 304 may be any suitable type of store, including but not limited to a database (e.g., a relational database, an entity-relationship database, an object database, an object relational database, an XML database, etc.). Location-based peer-to-peer channel logic 302 includes causation logic 306, profile logic 308, channel logic 310, session logic 312, and monitor logic 314. Further structural and operational implementations will be apparent to persons skilled in the relevant art(s) based on the discussion regarding flowchart 200.

As shown in FIG. 2, the method of flowchart 200 begins at step 202. In step 202, a designated wireless technology profile is identified from multiple wireless technology profiles to use at a designated location. Each of the wireless technology profiles may correspond to a wireless technology that is same as a wireless technology to which any one or more of the other wireless technology profiles correspond.

Each of the wireless technology profiles may correspond to a wireless technology that is different from a wireless technology to which any one or more of the other wireless technology profiles correspond. Example types of a wireless technology profile include but are not limited to a WiFi profile, which corresponds to a WiFi technology; a cellular profile, which corresponds to a cellular technology (e.g., LTE, UMTS, GPRS, or GSM); and a GPS profile, which corresponds to a GPS technology.

In an example implementation, profile logic 308 identifies the designated wireless technology profile to use at the designated location. For example, a location indicator 316 may indicate (e.g., specify) that the source device 300 is at the designated location. In accordance with this example, profile logic 308 may identify the designated wireless technology profile to use at the designated location based at least in part on the designated wireless technology profile being associated with the designated location.

In accordance with this implementation, profile logic 308 selects the designated wireless technology profile from multiple wireless technology profiles based at least in part on the designated wireless technology profile being associated with the designated location. For instance, each of the wireless technology profiles may be associated with a location. A first LTE profile, a first UMTS profile, a first GPRS profile, a first GSM profile, a first WiFi profile, and/or a first GPS profile may be associated with a first location. A second LTE profile, a second UMTS profile, a second GPRS profile, a second GSM profile, a second WiFi profile, and/or a second GPS profile may be associated with a second location, and so on. Profile logic 308 may compare the designated location with the location that is associated with each wireless technology profile to identify the wireless technology profile that is associated with the designated location. Profile logic 308 may identify the wireless technology profile further based on the wireless technology profile corresponding to a designated wireless technology (e.g., LTE, UMTS, GPRS, GSM, WiFi, or GPS). Thus, if various wireless technology profiles corresponding to respective wireless technologies are associated with the designated location, profile logic 308 may select the designated wireless technology profile from the various wireless technology profiles based on the designated wireless technology profile corresponding to the designated wireless technology.

In further accordance with this implementation, profile logic 308 may generate profile information 322 in response to identifying the designated wireless technology profile. The profile information 322 may indicate that the designated wireless technology profile is to be used at the designated location for a designated wireless technology. For example, the profile information 322 may include at least a portion of the designated wireless technology profile and/or information derived therefrom. In accordance with this example, the profile information 322 may indicate that the designated wireless technology profile indicates that the designated channel is to be used by the designated wireless technology.

At step 204, a designated channel is selected from multiple available channels based at least in part on the designated wireless technology profile indicating (e.g., specifying) that the designated channel is associated with a wireless technology. For example, the peer-to-peer technology may be Miracast®, MiracleCast™, or AirPlay®. In an example implementation, channel logic 310 selects the designated channel from multiple available channels. For example, channel logic 310 may select the designated channel in response to receipt of the profile information 322. In accordance with this example, channel logic 310 may select the designated channel based at least in part on the profile information 322 indicating that the designated wireless technology profile indicates that the designated channel is associated with the designated wireless technology. It should be noted that the designated wireless technology is different form the peer-to-peer technology. In accordance with this implementation, channel logic 310 may generate a channel indicator 324 in response to selecting the designated channel. For instance, the channel indicator 324 may specify that the designated channel is to be used to initiate a peer-to-peer session 332.

In an example implementation, selecting the designated channel at step 204 includes selecting the designated channel, in lieu of a default channel that is associated with the peer-to-peer technology, based at least in part on the designated wireless technology profile indicating that the designated channel is associated with the wireless technology.

In another example implementation, selecting the designated channel at step 204 includes selecting the designated channel from the available channels based at least in part on the designated wireless technology profile indicating that the designated channel is associated with a cellular technology (e.g., LTE, UMTS, GPRS, or GSM).

In yet another example implementation, selecting the designated channel at step 204 includes selecting the designated channel from the available channels based at least in part on the designated wireless technology profile indicating that the designated channel is associated with a GPS technology.

In still another example implementation, selecting the designated channel at step 204 includes selecting the designated channel from the available channels based at least in part on the designated wireless technology profile indicating that the designated channel is associated with a WiFi technology.

At step 206, a peer-to-peer session, which corresponds to a peer-to-peer technology that is different from the wireless technology, is initiated using the designated channel. For instance, the peer-to-peer session may be initiated in response to selecting the designated channel from multiple available channels at step 204. In one example, the peer-to-peer session may be initiated at the designated location. In another example, the peer-to-peer session may be initiated to provide (e.g., stream) information from a peer-to-peer source to a peer-to-peer sink. In an example implementation, session logic 312 initiates the peer-to-peer session 332 using the designated channel. For example, session logic 312 may initiate the peer-to-peer session 332 using the designated channel in response to receipt of the channel indicator 324. In accordance with this example, session logic 312 may initiate the peer-to-peer session 332 based at least in part on the channel indicator 324 specifying that the designated channel is to be used to initiate the peer-to-peer session 332.

In some example implementations, one or more steps 202, 204, and/or 206 of flowchart 200 may not be performed. Moreover, steps in addition to or in lieu of steps 202, 204, and/or 206 may be performed. For instance, in an example implementation, the method of flowchart 200 further includes causing the designated wireless technology profile to indicate that the designated channel is associated with the wireless technology based at least in part on a user preference indicating that the designated channel is to be used by the wireless technology at the designated location.

In an example implementation, store 304 stores a user preference 326. The user preference 326 may indicate that a user of the source device 300 prefers that the wireless technology use the designated channel at the designated location. In accordance with this implementation, causation logic 306 causes the designated wireless technology profile to indicate that the designated channel is associated with the wireless technology based at least in part on the user preference 326 indicating that the designated channel is to be used by the wireless technology at the designated location. For example, causation logic 306 may generate a profile instruction 320, which instructs profile logic 308 to configure the designated wireless technology profile to indicate that the designated channel is associated with the wireless technology (e.g., is to be used by the wireless technology at the designated location). In accordance with this example, profile logic 308 may configure the designated wireless technology profile to indicate that the designated channel is associated with the wireless technology in response to receipt of the profile instruction 320.

In another example implementation, the method of flowchart 200 further includes causing the designated wireless technology profile to indicate that the designated channel is associated with the wireless technology based at least in part on a determination that a frequency with which the designated channel is used by the wireless technology at the designated location is greater than or equal to a frequency with which each other available channel is used by the wireless technology at the designated location. In an example implementation, causation logic 306 causes the designated wireless technology profile to indicate that the designated channel is associated with the wireless technology based at least in part on the determination that the frequency with which the designated channel is used by the wireless technology at the designated location is greater than or equal to the frequency with which each other available channel is used by the wireless technology at the designated location.

For example, store 304 may store frequency indicators 328. The frequency indicators 328 may indicate a frequency with which each available channel is used by the corresponding wireless technology at one or more locations, including the designated location. In accordance with this example, monitor logic 314 may monitor wireless technology sessions that are established by source device 300 to determine the frequency with which each available channel is used by the corresponding wireless technology at the one or more locations. In further accordance with this example, causation logic 306 may review (e.g., analyze) the frequency indicators 328 to determine that the frequency with which the designated channel is used by the wireless technology at the designated location is greater than or equal to the frequency with which each other available channel is used by the wireless technology at the designated location.

Causation logic 306 may generate the profile instruction 320 to instruct profile logic 308 to configure the designated wireless technology profile to indicate that the designated channel is associated with the wireless technology (e.g., is to be used by the wireless technology at the designated location). Profile logic 308 may configure the designated wireless technology profile to indicate that the designated channel is associated with the wireless technology in response to receipt of the profile instruction 320.

In yet another example implementation, the available channels include a blacklisted channel that is specified in a blacklist. Each blacklisted channel that is specified in the blacklist is precluded from being used by the wireless technology at the designated location. In accordance with this implementation, the blacklisted channel is used more frequently than the designated channel by the wireless technology at the designated location. In further accordance with this implementation, the method of flowchart 200 further includes causing the designated wireless technology profile to indicate that the designated channel is associated with the wireless technology based at least in part on the blacklisted channel being specified in the blacklist. In an example implementation, causation logic 306 causes the designated wireless technology profile to indicate that the designated channel is associated with the wireless technology based at least in part on blacklist information 330 specifying the blacklisted channel (e.g., based at least in part on the blacklist information 330 indicating that the blacklisted channel is precluded from being used by the wireless technology at the designated location).

For example, store 304 may store the blacklist information 330. In accordance with this example, causation logic 306 may review (e.g., analyze) the blacklist information 330 to determine that the blacklist information 330 specifies the blacklisted channel (e.g., indicates that the blacklisted channel is precluded from being used by the wireless technology at the designated location).

Causation logic 306 may generate the profile instruction 320 to instruct profile logic 308 to configure the designated wireless technology profile to indicate that the designated channel is associated with the wireless technology, even though the blacklisted channel is used more frequently than the designated channel by the wireless technology at the designated location, based at least in part on the blacklist information 330 specifying the blacklisted channel. Profile logic 308 may configure the designated wireless technology profile to indicate that the designated channel is associated with the wireless technology in response to receipt of the profile instruction 320.

In still another example implementation, the method of flowchart 200 further includes monitoring activity of a user with regard to one or more sessions that are established to utilize the wireless technology at the location. In an example implementation, monitor logic 314 monitors the activity of the user. For example, the activity of the user may be logged in activity information 318. In accordance with this example, monitor logic 314 may review the activity information 318 to determine the activity of the user. For instance, activity information 318 may identify inputs that the user provides via user interface(s) of the source device 300 via the one or more sessions and operations that are performed by the source device 300 in response to such inputs. In accordance with this implementation, the method of flowchart 200 further includes causing the designated wireless technology profile to indicate that the designated channel is associated with the wireless technology based at least in part on the activity of the user including a user-initiated switching activity that causes switching from an initially selected channel to the designated channel for at least one of the one or more sessions. The user-initiated switching activity may cause the switching for any of a variety of reasons, including but not limited to the initially selected channel being disabled or providing a relatively low quality of service (e.g., a number of gaps in the resulting video exceeding a threshold number and/or a duration of gap(s) in the video exceeding a threshold duration).

In one example, the one or more sessions includes a plurality of sessions. In accordance with this example, the designated wireless technology profile may be caused to indicate that the designated channel is associated with the wireless technology based at least in part on a habit of the user to provide a user-initiated switching instruction that causes switching from the initially selected channel to the designated channel for at least some (e.g., for at least a threshold number) of the plurality of sessions.

In one aspect of this example, the initially selected channel may be a 2.4 GHz WiFi channel, and the designated channel may be a 5.0 GHz WiFi channel. In accordance with this aspect, the user-initiated switching instruction may be an instruction by the user to select the service set identifier (SSID) associated with the 5.0 GHz WiFi channel (e.g., as opposed to the SSID associated with the 2.4 GHz WiFi channel).

In an example implementation, causation logic 306 causes the designated wireless technology profile to indicate that the designated channel is associated with the wireless technology based at least in part on the activity information 318 indicating a switching activity that is initiated by the user and that causes switching from an initially selected channel to the designated channel for at least one of the one or more sessions. For example, monitor logic 314 may generate switching information 334 to specify that the activity information 318 indicates the user-initiated switching activity. In accordance with this example, causation logic 306 may cause the designated wireless technology profile to indicate that the designated channel is associated with the wireless technology in response to receipt of the switching information 334 (e.g., based at least in part on the switching information 334 specifying that the activity information 318 indicates the user-initiated switching activity).

Causation logic 306 may generate the profile instruction 320 to instruct profile logic 308 to configure the designated wireless technology profile to indicate that the designated channel is associated with the wireless technology based at least in part on the switching information 334 specifying that the activity information 318 indicates the user-initiated switching activity. Profile logic 308 may configure the designated wireless technology profile to indicate that the designated channel is to be used by the wireless technology in response to receipt of the profile instruction 320.

It will be recognized that source device 300 may not include one or more of location-based peer-to-peer channel logic 302, store 304, causation logic 306, profile logic 308, channel logic 310, session logic 312, and/or monitor logic 314. Furthermore, source device 300 may include components in addition to or in lieu of location-based peer-to-peer channel logic 302, store 304, causation logic 306, profile logic 308, channel logic 310, session logic 312, and/or monitor logic 314.

Figure 4:
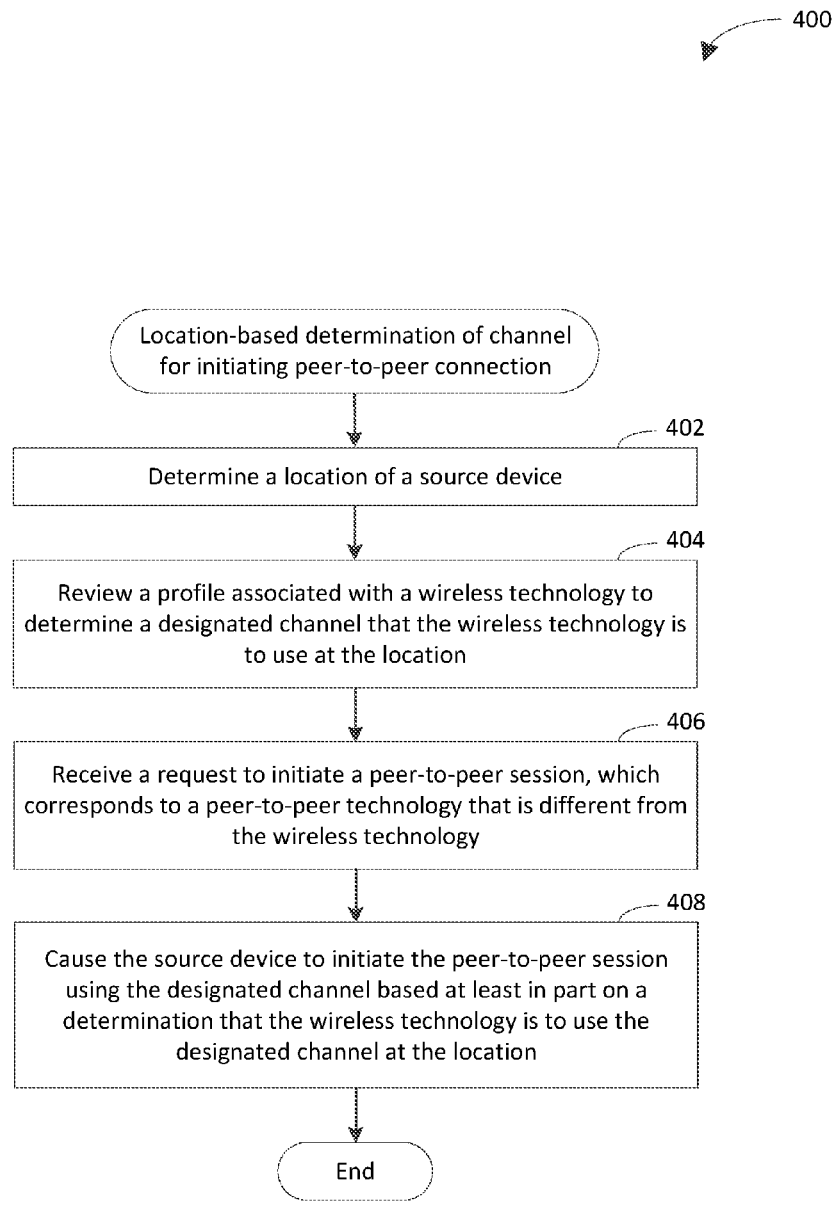
Figure 5:
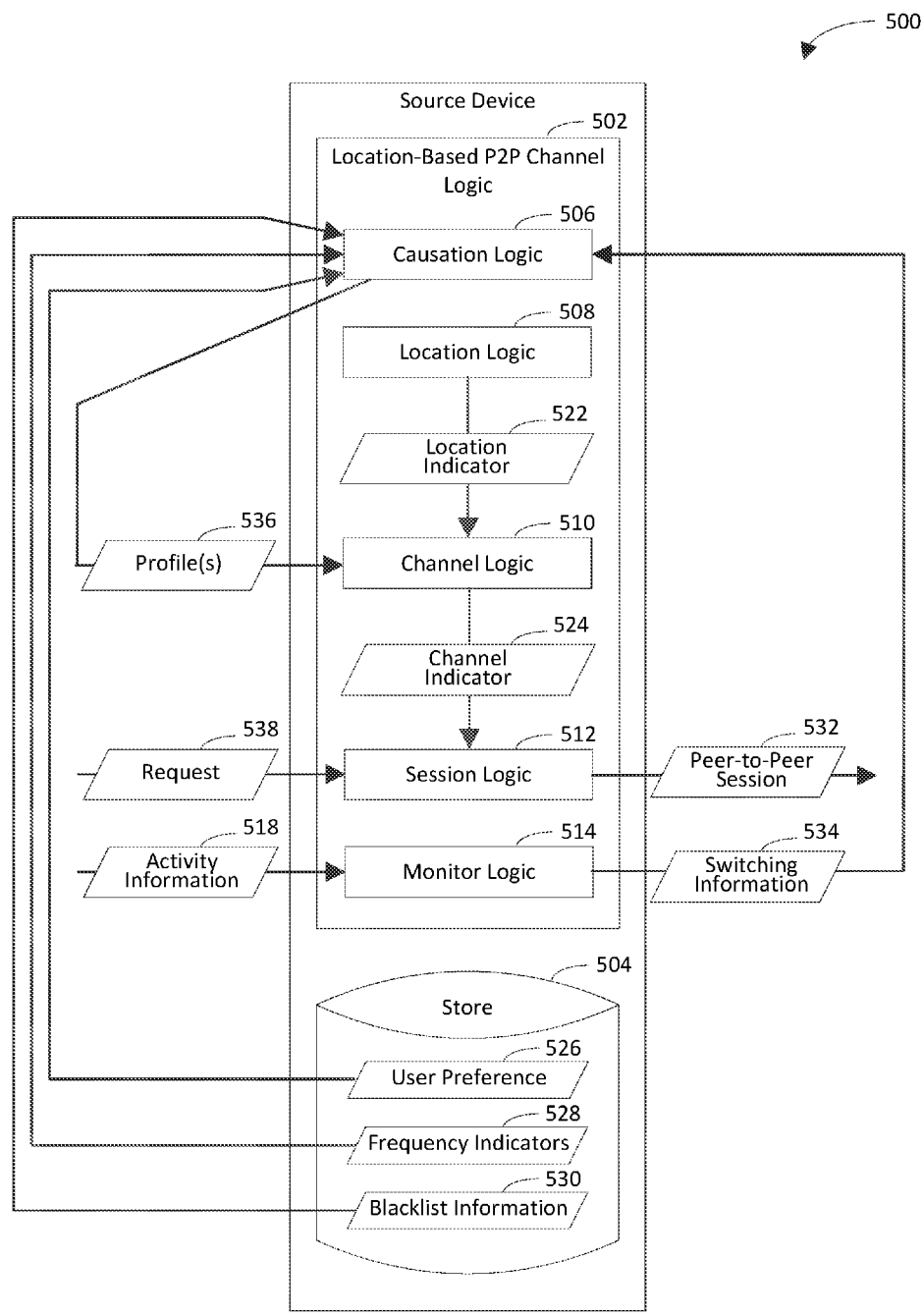

FIG. 4 depicts a flowchart 400 of another example method for performing a location-based determination of a channel for initiating a peer-to-peer session. Flowchart 400 may be performed by location-based peer-to-peer channel logic 108 shown in FIG. 1, for example. For illustrative purposes, flowchart 400 is described with respect to source device 500 shown in FIG. 5. Source device 500 includes location-based peer-to-peer channel logic 502, which is an example of location-based peer-to-peer channel logic 108, according to an implementation. As shown in FIG. 3, source device 500 further includes a store 504. Store 504 may be any suitable type of store, including but not limited to a database (e.g., a relational database, an entity-relationship database, an object database, an object relational database, an XML database, etc.). Location-based peer-to-peer channel logic 502 includes causation logic 506, location logic 508, channel logic 510, session logic 512, and monitor logic 514. Further structural and operational implementations will be apparent to persons skilled in the relevant art(s) based on the discussion regarding flowchart 400.

As shown in FIG. 4, the method of flowchart 400 begins at step 402. In step 402, a location of a source device (e.g., a mobile device) is determined. In an example implementation, location logic 508 determines a location of source device 500. For instance, location logic 508 may utilize a wireless technology-specific technique to determine the location of source device 500, though the scope of the example implementations is not limited in this respect. For example, if source device 500 is GPS-enabled, location logic 508 may utilize GPS to determine the location of source device 500. In accordance with this example, if source device 500 is not GPS-enabled, location logic 508 may utilize a technique set forth in the LTE standard to determine the location. In further accordance with this example, if source device 500 is not LTE-enabled, location logic 508 may utilize a technique set forth in the WiFi standard, and so on. The example wireless technologies, location techniques, and order of priority are provided for illustrative purposes and are not intended to be limiting. It will be recognized that any suitable wireless technologies, location techniques, and order of priority may be utilized to determine the location of source device 500.

Location logic 508 may generate a location indicator 522 in response to determining the location of source device 500. The location indicator 522 specifies the location of source device 500.

At step 404, a profile associated with a wireless technology is reviewed to determine a designated channel that the wireless technology is to use at the location. The profile may be further associated with the location, though the scope of the example implementations is not limited in this respect. For instance, the profile may be specific to the location.

In an example implementation, channel logic 510 reviews the profile associated with the wireless technology to determine the designated channel. For example, profile(s) 536 may include the profile associated with the wireless technology. In accordance with this example, each of profile(s) 536 may indicate a channel that a wireless technology is to use at a location. In further accordance with this example, the profile(s) 536 may include a first WiFi profile that indicates that a WiFi technology is to use a first channel at a first location, a second WiFi profile that indicates that the WiFi technology is to use a second channel at a second location, and so on. In further accordance with this example, the profile(s) 536 may include a first GPS profile that indicates that a GPS technology is to use a third channel (or one of the first and second channels) at the first location, a second GPS profile that indicates that the GPS technology is to use a fourth channel (or one of the first and second channels) at the second location, and so on. The profile(s) 536 may include any suitable wireless technology profiles in addition to or in lieu of any one or more of those mentioned above. Channel logic 510 may cross-reference the location of source device 500, as specified by the location indicator 522, with the locations identified in the profile(s) 536 to determine the designated channel. For instance, channel logic 510 may determine the designated channel based at least in part on the location of source device 500 that is specified by the location indicator 522 matching the location at which the wireless technology is to use the designated channel, as indicated by the profile.

Channel logic 510 may generate a channel indicator 524 in response to determining the designated channel. The channel indicator 524 specifies the designated channel. For instance, the channel indicator may indicate that the wireless technology is to use designated channel at the location.

At step 406, a request to initiate a peer-to-peer session is received. The peer-to-peer session corresponds to a peer-to-peer technology that is different from the wireless technology. For example, the request may indicate that the peer-to-peer session is to be initiated to enable information (e.g., a data stream) to be provided from the source device to a peer-to-peer sink device. In another example, the peer-to-peer technology may be Miracast®, MiracleCast™, or AirPlay®. In an example implementation, session logic 512 receives a request 538 to initiate a peer-to-peer session 532.

At step 408, the source device is caused to initiate the peer-to-peer session using the designated channel based at least in part on a determination that the wireless technology is to use the designated channel at the location. In an example, the source device is caused to initiate the peer-to-peer session using the designated channel further based at least in part on a determination that the peer-to-peer session is to be initiated at the location. In an example implementation, session logic 512 causes source device 500 to initiate the peer-to-peer session 532 using the designated channel. For example, session logic 512 may cause source device 500 to initiate the peer-to-peer session 532 using the designated channel in response to receipt of the channel indicator 524 (e.g., in response to the channel indicator 524 specifying the designated channel and/or in response to receipt of the request 538.

In an example implementation, causing the source device to initiate the peer-to-peer session at step 408 includes causing the source device to initiate the peer-to-peer session using the designated channel in lieu of a default channel that is associated with the peer-to-peer technology based at least in part on a determination that the wireless technology is to use the designated channel at the location, in response to receiving the request.

In another example implementation, reviewing the profile at step 404 includes reviewing the profile associated with a cellular technology (e.g., LTE, UMTS, GPRS, or GSM) to determine the designated channel that the cellular technology is to use at the location. In accordance with this example, causing the source device to initiate the peer-to-peer session at step 408 includes causing the source device to initiate the peer-to-peer session using the designated channel based at least in part on a determination that the cellular technology is to use the designated channel at the location, in response to receiving the request.

In yet another example implementation, reviewing the profile at step 404 includes reviewing the profile associated with a GPS technology to determine the designated channel that the GPS technology is to use at the location. In accordance with this example, causing the source device to initiate the peer-to-peer session at step 408 includes causing the source device to initiate the peer-to-peer session using the designated channel based at least in part on a determination that the GPS technology is to use the designated channel at the location, in response to receiving the request.

In still another example implementation, reviewing the profile at step 404 includes reviewing the profile associated with a WiFi technology to determine the designated channel that the WiFi technology is to use at the location. In accordance with this implementation, causing the source device to initiate the peer-to-peer session at step 408 includes causing the source device to initiate the peer-to-peer session using the designated channel based at least in part on a determination that the WiFi technology is to use the designated channel at the location, in response to receiving the request.

In some example implementations, one or more steps 402, 404, 406, and/or 408 of flowchart 400 may not be performed. Moreover, steps in addition to or in lieu of steps 402, 404, 406, and/or 408 may be performed. For instance, in an example implementation, the method of flowchart 400 further includes causing the profile to indicate that the wireless technology is to use the designated channel at the location based at least in part on a user preference indicating that the wireless technology is to use the designated channel at the location. In an example implementation, store 504 stores a user preference 526. The user preference 526 may indicate that a user of the source device 300 prefers that the wireless technology use the designated channel at the location. In accordance with this implementation, causation logic 506 causes (e.g., configures) the profile to indicate that the wireless technology is to use designated channel at the location based at least in part on the user preference 526 indicating that the user of the source device 500 prefers that the wireless technology use the designated channel at the location. For example, causation logic 506 may provide profile(s) 538, including the profile configured to indicate that the wireless technology is to use the designated channel at the location.

In another example implementation, the method of flowchart 400 further includes causing the profile to indicate that the wireless technology is to use the designated channel at the location based at least in part on a determination that a frequency with which the wireless technology uses the designated channel at the location is greater than or equal to a frequency with which the wireless technology uses each other channel at the location. In an example implementation, causation logic 506 causes the profile to indicate that the wireless technology is to use the designated channel at the location based at least in part on the determination that the frequency with which the wireless technology uses the designated channel at the location is greater than or equal to the frequency with which the wireless technology uses each other channel at the location.

For example, store 504 may store frequency indicators 528. The frequency indicators 528 may indicate a frequency with which the wireless technology uses each channel at the location. In accordance with this example, monitor logic 514 may monitor wireless technology sessions that are established by source device 500 to determine the frequency with which the wireless technology uses each channel at the location. In further accordance with this example, causation logic 3506 may review (e.g., analyze) the frequency indicators 528 to determine that the frequency with which the wireless technology uses the designated channel at the location is greater than or equal to the frequency with which the wireless technology uses each other channel at the location.

In yet another example implementation, a blacklisted channel is specified in a blacklist. The blacklist indicates that the wireless technology is not to use the blacklisted channel at the location. In accordance with this implementation, the blacklisted channel is used more frequently than the designated channel by the wireless technology at the location. In further accordance with this implementation, the method of flowchart 400 further includes causing the profile to indicate that the wireless technology is to use the designated channel at the location based at least in part on the blacklisted channel being specified in the blacklist. In an example implementation, causation logic 506 causes the profile to indicate that the wireless technology is to use the designated channel at the location based at least in part on blacklist information 330 specifying the blacklisted channel (e.g., based at least in part on the blacklist information 330 indicating that the wireless technology is not to use the blacklisted channel at the location).

For example, store 504 may store the blacklist information 530. In accordance with this example, causation logic 506 may review (e.g., analyze) the blacklist information 530 to determine that the blacklist information 530 specifies the blacklisted channel (e.g., indicates that the wireless technology is not to use the blacklisted channel at the designated location).

In still another example implementation, the method of flowchart 400 further includes monitoring activity of a user of the device with regard to one or more sessions that are initiated for the wireless technology at the location. In an example implementation, monitor logic 514 monitors the activity of the user. For example, the activity of the user may be logged in activity information 518. In accordance with this example, monitor logic 514 may review the activity information 518 to determine the activity of the user. In accordance with this implementation, the method of flowchart 400 further includes causing the profile to indicate that the wireless technology is to use the designated channel at the location based at least in part on a determination that the user causes at least one of the one or more sessions to be reconfigured such that the respective session switches from using an initially selected channel to using the designated channel. For example, the one or more sessions include a plurality of sessions. In accordance with this example, the profile may be caused to indicate that the wireless technology is to use the designated channel at the location based at least in part on a habit of the user to provide a reconfiguration instruction that causes the respective connection to be reconfigured such that the respective connection switches from using the initially selected channel to using the designated channel.

In an example implementation, causation logic 506 causes the profile to indicate that the wireless technology is to use the designated channel at the location based at least in part on the activity information 518 indicating that the user causes at least one of the one or more sessions to be reconfigured such that the respective session switches from using the initially selected channel to using the designated channel.

For example, monitor logic 514 may generate switching information 534 to specify that the activity information 518 indicates that the user causes at least one of the one or more sessions to be reconfigured such that the respective session switches from using the initially selected channel to using the designated channel. In accordance with this example, causation logic 506 may cause the profile to indicate that the wireless technology is to use the designated channel at the location in response to receipt of the switching information 534 (e.g., based at least in part on the switching information 534 specifying that the activity information 518 indicates that the user causes at least one of the one or more sessions to be reconfigured such that the respective session switches from using the initially selected channel to using the designated channel.

It will be recognized that source device 500 may not include one or more of location-based peer-to-peer channel logic 502, store 504, causation logic 506, location logic 508, channel logic 510, session logic 512, and/or monitor logic 514. Furthermore, source device 500 may include components in addition to or in lieu of location-based peer-to-peer channel logic 502, store 504, causation logic 506, location logic 508, channel logic 510, session logic 512, and/or monitor logic 514.

Figure 6:
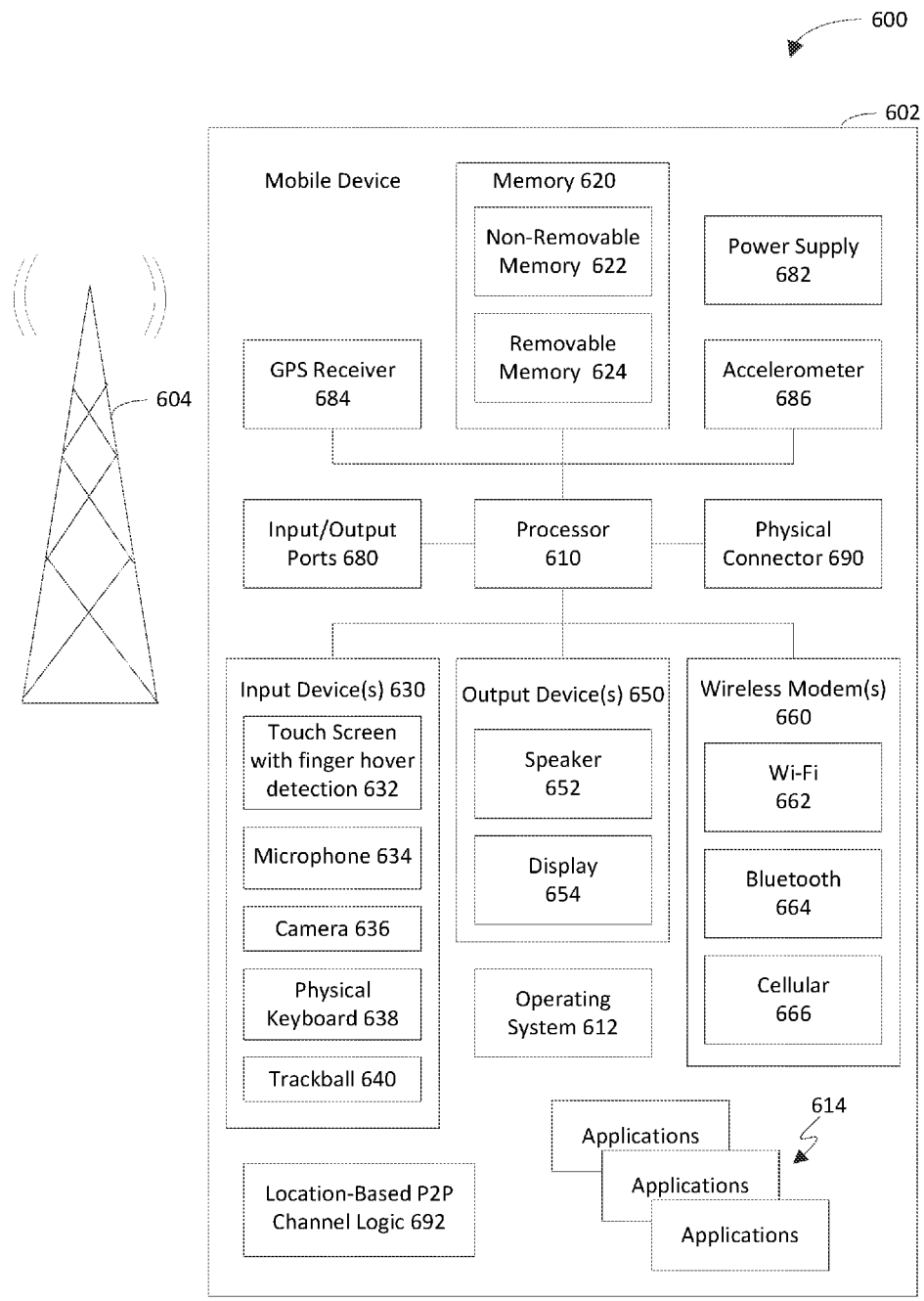
FIG. 6 is a system diagram of an exemplary mobile device.

FIG. 6 is a system diagram of an exemplary mobile device 600 including a variety of optional hardware and software components, shown generally as 602. Any components 602 in the mobile device may communicate with any other component, though not all connections are shown, for ease of illustration. The mobile device 600 may be any of a variety of computing devices (e.g., cell phone, smartphone, handheld computer, Personal Digital Assistant (PDA), etc.) and may allow wireless two-way communications with one or more mobile communications networks 604, such as a cellular or satellite network, or with a local area or wide area network.

The mobile device 600 may include a processor 610 (e.g., signal processor, microprocessor, ASIC, or other control and processing logic circuitry) for performing such tasks as signal coding, data processing, input/output processing, power control, and/or other functions. An operating system 612 may control the allocation and usage of the components 602 and support for one or more applications 614 (a.k.a. application programs). The applications 614 may include common mobile computing applications (e.g., email applications, calendars, contact managers, web browsers, messaging applications) and any other computing applications (e.g., word processing applications, mapping applications, media player applications).

The mobile device 600 may include memory 620. Memory 620 may include non-removable memory 622 and/or removable memory 624. The non-removable memory 622 may include RAM, ROM, flash memory, a hard disk, or other well-known memory storage technologies. The removable memory 624 may include flash memory or a Subscriber Identity Module (SIM) card, which is well known in GSM communication systems, or other well-known memory storage technologies, such as "smart cards." Memory 620 may store data and/or code for running the operating system 612 and the applications 614. Example data may include web pages, text, images, sound files, video data, or other data sets to be sent to and/or received from one or more network servers or other devices via one or more wired or wireless networks. Memory 620 may store a subscriber identifier, such as an International Mobile Subscriber Identity (IMSI), and an equipment identifier, such as an International Mobile Equipment Identifier (IMEI). Such identifiers may be transmitted to a network server to identify users and equipment.

The mobile device 600 may support one or more input devices 630, such as a touch screen 632, microphone 634, camera 636, physical keyboard 638 and/or trackball 640 and one or more output devices 650, such as a speaker 652 and a display 654. Touch screens, such as touch screen 632, may detect input in different ways. For example, capacitive touch screens detect touch input when an object (e.g., a fingertip) distorts or interrupts an electrical current running across the surface. As another example, touch screens may use optical sensors to detect touch input when beams from the optical sensors are interrupted. Physical contact with the surface of the screen is not necessary for input to be detected by some touch screens. For example, the touch screen 632 may support a finger hover detection using capacitive sensing, as is well understood in the art. Other detection techniques may be used, including camera-based detection and ultrasonic-based detection. To implement a finger hover, a user's finger is typically within a predetermined spaced distance above the touch screen, such as between 0.1 to 0.25 inches, or between 0.0.25 inches and 0.05 inches, or between 0.0.5 inches and 0.75 inches, or between 0.75 inches and 1 inch, or between 1 inch and 1.5 inches, etc.

The mobile device 600 may include location-based peer-to-peer channel logic 692. The location-based peer-to-peer channel logic 692 is configured to perform a location-based determination of a channel for initiating a peer-to-peer session in accordance with any one or more of the techniques described herein.

Other possible output devices (not shown) may include piezoelectric or other haptic output devices. Some devices may serve more than one input/output function. For example, touch screen 632 and display 654 may be combined in a single input/output device. The input devices 630 may include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 612 or applications 614 may include speech-recognition software as part of a voice control interface that allows a user to operate the device 600 via voice commands. Furthermore, the device 600 may include input devices and software that allows for user interaction via a user's spatial gestures, such as detecting and interpreting gestures to provide input to a gaming application.

Wireless modem(s) 660 may be coupled to antenna(s) (not shown) and may support two-way communications between the processor 610 and external devices, as is well understood in the art. The modem(s) 660 are shown generically and may include a cellular modem 666 for communicating with the mobile communication network 604 and/or other radio-based modems (e.g., Bluetooth 664 and/or Wi-Fi 662). At least one of the wireless modem(s) 660 is typically configured for communication with one or more cellular networks, such as a GSM network for data and voice communications within a single cellular network, between cellular networks, or between the mobile device and a public switched telephone network (PSTN).

The mobile device may further include at least one input/output port 680, a power supply 682, a satellite navigation system receiver 684, such as a Global Positioning System (GPS) receiver, an accelerometer 686, and/or a physical connector 690, which may be a USB port, IEEE 1394 (FireWire) port, and/or RS-232 port. The illustrated components 602 are not required or all-inclusive, as any components may be deleted and other components may be added as would be recognized by one skilled in the art.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of location-based peer-to-peer channel logic 108, location-based peer-to-peer channel logic 302, causation logic 306, profile logic 308, channel logic 310, session logic 312, monitor logic 314, location-based peer-to-peer channel logic 502, causation logic 506, location logic 508, channel logic 510, session logic 512, monitor logic 514, location-based peer-to-peer channel logic 692, flowchart 200, and/or flowchart 400 may be implemented in hardware, software, firmware, or any combination thereof.

For example, any one or more of location-based peer-to-peer channel logic 108, location-based peer-to-peer channel logic 302, causation logic 306, profile logic 308, channel logic 310, session logic 312, monitor logic 314, location-based peer-to-peer channel logic 502, causation logic 506, location logic 508, channel logic 510, session logic 512, monitor logic 514, location-based peer-to-peer channel logic 692, flowchart 200, and/or flowchart 400 may be implemented as computer program code configured to be executed in one or more processors.

In another example, any one or more of location-based peer-to-peer channel logic 108, location-based peer-to-peer channel logic 302, causation logic 306, profile logic 308, channel logic 310, session logic 312, monitor logic 314, location-based peer-to-peer channel logic 502, causation logic 506, location logic 508, channel logic 510, session logic 512, monitor logic 514, location-based peer-to-peer channel logic 692, flowchart 200, and/or flowchart 400 may be implemented as hardware logic/electrical circuitry.

For instance, in an example implementation, one or more of location-based peer-to-peer channel logic 108, location-based peer-to-peer channel logic 302, causation logic 306, profile logic 308, channel logic 310, session logic 312, monitor logic 314, location-based peer-to-peer channel logic 502, causation logic 506, location logic 508, channel logic 510, session logic 512, monitor logic 514, location-based peer-to-peer channel logic 692, flowchart 200, and/or flowchart 400 may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Example Computer System

Figure 7:
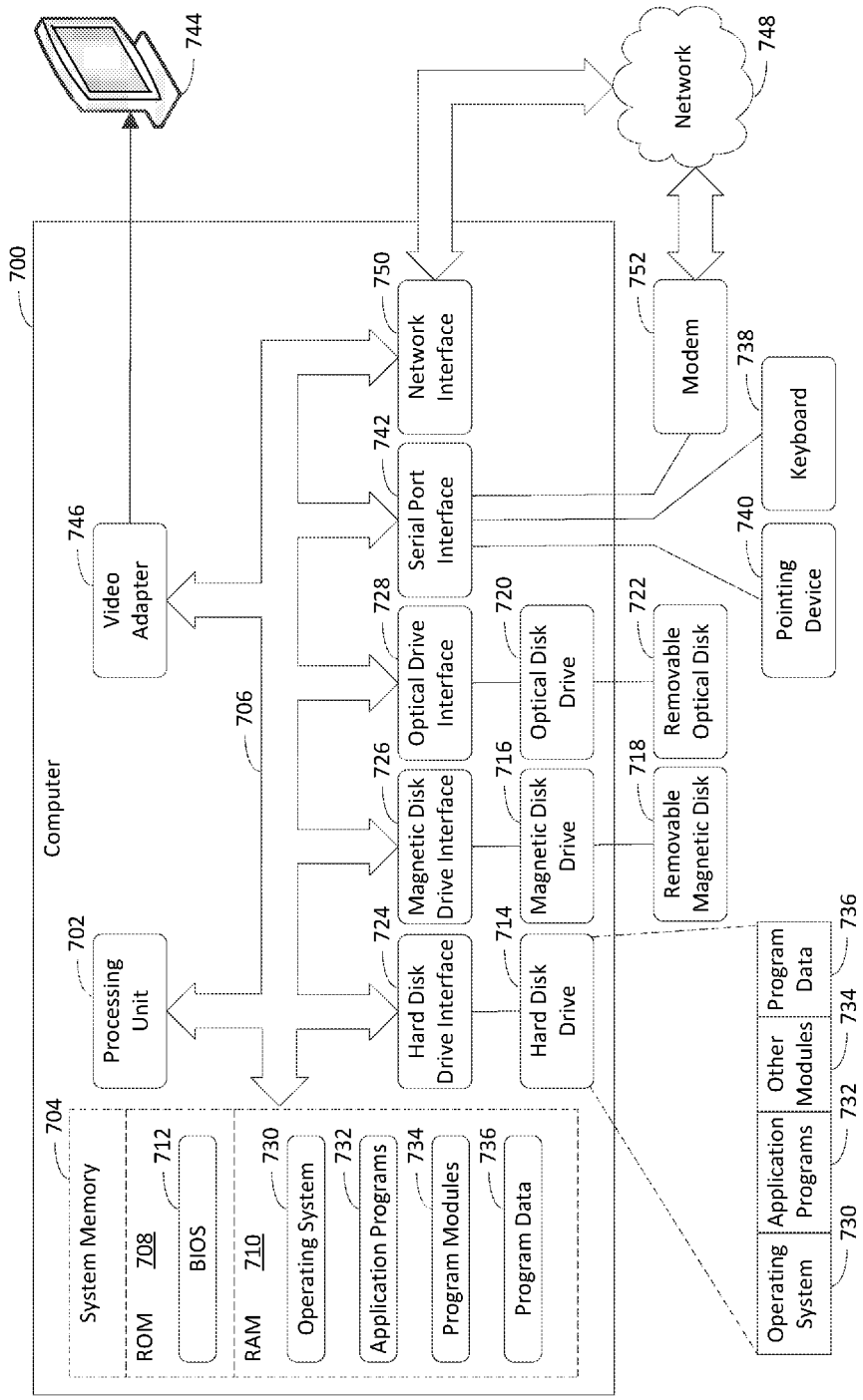
FIG. 7 depicts an example computer in which the disclosed technologies may be implemented.

FIG. 7 depicts an example computer 700 in which implementations of the present disclosure may be implemented. For instance, any one or more of source device 102 and/or sink device 104 shown in FIG. 1, source device 300 shown in FIG. 3, source device 500 shown in FIG. 5, and/or mobile device 600 shown in FIG. 6 may be implemented using computer 700, including one or more features of computer 700 and/or alternative features. Computer 700 may be a general-purpose computing device in the form of a conventional personal computer, a mobile computer, or a workstation, for example, or computer 700 may be a special purpose computing device. The description of computer 700 provided herein is provided for purposes of illustration, and is not intended to be limiting. Implementations of the present disclosure may be implemented in further types of computer systems, as would be known to persons skilled in the relevant art(s).

As shown in FIG. 7, computer 700 includes a processing unit 702, a system memory 704, and a bus 706 that couples various system components including system memory 704 to processing unit 702. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random access memory (RAM) 710. A basic input/output system 712 (BIOS) is stored in ROM 708.

Computer 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 730, one or more application programs 732, other program modules 734, and program data 736. Application programs 732 or program modules 734 may include, for example, computer program logic for implementing any one or more of location-based peer-to-peer channel logic 108, location-based peer-to-peer channel logic 302, causation logic 306, profile logic 308, channel logic 310, session logic 312, monitor logic 314, location-based peer-to-peer channel logic 502, causation logic 506, location logic 508, channel logic 510, session logic 512, monitor logic 514, location-based peer-to-peer channel logic 692, flowchart 200 (including any step of flowchart 200), and/or flowchart 400 (including any step of flowchart 400), as described herein.

A user may enter commands and information into the computer 700 through input devices such as keyboard 738 and pointing device 740. Other input devices (not shown) may include a microphone, joystick, game pad, satellite dish, scanner, touch screen, camera, accelerometer, gyroscope, or the like. These and other input devices are often connected to the processing unit 702 through a serial port interface 742 that is coupled to bus 706, but may be connected by other interfaces, such as a parallel port, game port, or a universal serial bus (USB).

A display device 744 (e.g., a monitor) is also connected to bus 706 via an interface, such as a video adapter 746. In addition to display device 744, computer 700 may include other peripheral output devices (not shown) such as speakers and printers.

Computer 700 is connected to a network 748 (e.g., the Internet) through a network interface or adapter 750, a modem 752, or other means for establishing communications over the network. Modem 752, which may be internal or external, is connected to bus 706 via serial port interface 742.

As used herein, the terms "computer program medium" and "computer-readable storage medium" are used to generally refer to media (e.g., non-transitory media) such as the hard disk associated with hard disk drive 714, removable magnetic disk 718, removable optical disk 722, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example implementations are also directed to such communication media.

As noted above, computer programs and modules (including application programs 732 and other program modules 734) may be stored on the hard disk, magnetic disk, optical disk, ROM, or RAM. Such computer programs may also be received via network interface 750 or serial port interface 742. Such computer programs, when executed or loaded by an application, enable computer 700 to implement features of examples discussed herein. Accordingly, such computer programs represent controllers of the computer 700.

Example implementations are also directed to computer program products comprising software (e.g., computer-readable instructions) stored on any computer-useable medium. Such software, when executed in one or more data processing devices, causes data processing device(s) to operate as described herein. Implementations may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

IV. Further Discussion of Some Example Implementations

A first example system comprises profile logic configured to identify a designated wireless technology profile from a plurality of wireless technology profiles to use at a designated location. The first example system further comprises channel logic configured to select a designated channel from a plurality of available channels based at least in part on the designated wireless technology profile indicating that the designated channel is associated with a wireless technology. The first example system further comprises session logic configured to initiate a peer-to-peer session, which corresponds to a peer-to-peer technology that is different from the wireless technology, using the designated channel in response to the designated channel being selected from the plurality of available channels.

In a first aspect of the first example system, the channel logic is configured to select the designated channel, in lieu of a default channel that is associated with the peer-to-peer technology, based at least in part on the designated wireless technology profile indicating that the designated channel is associated with the wireless technology.

In a second aspect of the first example system, the first example system further comprises causation logic configured to cause the designated wireless technology profile to indicate that the designated channel is associated with the wireless technology based at least in part on a user preference indicating that the designated channel is to be used by the wireless technology at the designated location. The second aspect of the first example system may be implemented in combination with the first aspect of the first example system, though the example implementations are not limited in this respect.

In a third aspect of the first example system, the first example system further comprises causation logic configured to cause the designated wireless technology profile to indicate that the designated channel is associated with the wireless technology based at least in part on a determination that a frequency with which the designated channel is used by the wireless technology at the designated location is greater than or equal to a frequency with which each other channel in the plurality of available channels is used by the wireless technology at the designated location. The third aspect of the first example system may be implemented in combination with the first and/or second aspect of the first example system, though the example implementations are not limited in this respect.

In a fourth aspect of the first example system, the plurality of available channels includes a blacklisted channel that is specified in a blacklist. In accordance with the fourth aspect, each blacklisted channel that is specified in the blacklist is precluded from being used by the wireless technology at the designated location. In further accordance with the fourth aspect, the blacklisted channel is used more frequently than the designated channel by the wireless technology at the designated location. In further accordance with the fourth aspect, the first example system further comprises causation logic configured to cause the designated wireless technology profile to indicate that the designated channel is associated with the wireless technology based at least in part on the blacklisted channel being specified in the blacklist. The fourth aspect of the first example system may be implemented in combination with the first, second, and/or third aspect of the first example system, though the example implementations are not limited in this respect.

In a fifth aspect of the first example system, the first example system further comprises monitor logic configured to monitor activity of a user with regard to one or more sessions that are established to utilize the wireless technology at the location. In accordance with the fifth aspect, the first example system further comprises causation logic configured to cause the designated wireless technology profile to indicate that the designated channel is associated with the wireless technology based at least in part on the activity of the user including a user-initiated switching activity that causes switching from an initially selected channel to the designated channel for at least one of the one or more sessions. The fifth aspect of the first example system may be implemented in combination with the first, second, third, and/or fourth aspect of the first example system, though the example implementations are not limited in this respect.

In a sixth aspect of the first example system, the channel logic is configured to select the designated channel from the plurality of available channels based at least in part on the designated wireless technology profile indicating that the designated channel is associated with a cellular technology. The sixth aspect of the first example system may be implemented in combination with the first, second, third, fourth, and/or fifth aspect of the first example system, though the example implementations are not limited in this respect.

In a seventh aspect of the first example system, the channel logic is configured to select the designated channel from the plurality of available channels based at least in part on the designated wireless technology profile indicating that the designated channel is associated with a global positioning system (GPS) technology. The seventh aspect of the first example system may be implemented in combination with the first, second, third, fourth, fifth, and/or sixth aspect of the first example system, though the example implementations are not limited in this respect.

In an eighth aspect of the first example system, the channel logic is configured to select the designated channel from the plurality of available channels based at least in part on the designated wireless technology profile indicating that the designated channel is associated with a WiFi technology. The eighth aspect of the first example system may be implemented in combination with the first, second, third, fourth, fifth, sixth, and/or seventh aspect of the first example system, though the example implementations are not limited in this respect.

A second example system comprises location logic configured to determine a location of a source device. The second example system further comprises channel logic configured to review a profile associated with a wireless technology to determine a designated channel that the wireless technology is to use at the location. The second example system further comprises connection logic configured to cause the source device to initiate a peer-to-peer session, which corresponds to a peer-to-peer technology that is different from the wireless technology, using the designated channel based at least in part on a determination that the wireless technology is to use the designated channel at the location, in response to receipt of a request to initiate the peer-to-peer session.

In a first aspect of the second example system, the connection logic is configured to cause the source device to initiate the peer-to-peer session using the designated channel in lieu of a default channel that is associated with the peer-to-peer technology based at least in part on a determination that the wireless technology is to use the designated channel at the location.

In a second aspect of the second example system, the second example system further comprises causation logic configured to cause the profile to indicate that the wireless technology is to use the designated channel at the location based at least in part on a user preference indicating that the wireless technology is to use the designated channel at the location. The second aspect of the second example system may be implemented in combination with the first aspect of the second example system, though the example implementations are not limited in this respect.

In a third aspect of the second example system, the second example system further comprises causation logic configured to cause the profile to indicate that the wireless technology is to use the designated channel at the location based at least in part on a determination that a frequency with which the wireless technology uses the designated channel at the location is greater than or equal to a frequency with which the wireless technology uses each other channel at the location. The third aspect of the second example system may be implemented in combination with the first and/or second aspect of the second example system, though the example implementations are not limited in this respect.

In a fourth aspect of the second example system, a blacklisted channel is specified in a blacklist. In accordance with the fourth aspect, the blacklist indicates that the wireless technology is not to use the blacklisted channel at the location. In further accordance with the fourth aspect, the blacklisted channel is used more frequently than the designated channel by the wireless technology at the location. In further accordance with the fourth aspect, the second example system further comprises causation logic configured to cause the profile to indicate that the wireless technology is to use the designated channel at the location based at least in part on the blacklisted channel being specified in the blacklist. The fourth aspect of the second example system may be implemented in combination with the first, second, and/or third aspect of the second example system, though the example implementations are not limited in this respect.

In a fifth aspect of the second example system, the second example system further comprises monitor logic configured to monitor activity of a user of the device with regard to one or more sessions that are initiated for the wireless technology at the location. In accordance with the fifth aspect, the second example system further comprises causation logic configured to cause the profile to indicate that the wireless technology is to use the designated channel at the location based at least in part on a determination that the user causes at least one of the one or more sessions to be reconfigured such that the respective session switches from using an initially selected channel to using the designated channel. The fifth aspect of the second example system may be implemented in combination with the first, second, third, and/or fourth aspect of the second example system, though the example implementations are not limited in this respect.

In a sixth aspect of the second example system, the channel logic is configured to review the profile associated with a cellular technology to determine the designated channel that the cellular technology is to use at the location. In accordance with the sixth aspect, the connection logic is configured to cause the source device to initiate the peer-to-peer session using the designated channel based at least in part on a determination that the cellular technology is to use the designated channel at the location. The sixth aspect of the second example system may be implemented in combination with the first, second, third, fourth, and/or fifth aspect of the second example system, though the example implementations are not limited in this respect.

In a seventh aspect of the second example system, the channel logic is configured to review the profile associated with a global positioning system (GPS) technology to determine the designated channel that the GPS technology is to use at the location. In accordance with the seventh aspect, the connection logic is configured to cause the source device to initiate the peer-to-peer session using the designated channel based at least in part on a determination that the GPS technology is to use the designated channel at the location. The seventh aspect of the second example system may be implemented in combination with the first, second, third, fourth, fifth, and/or sixth aspect of the second example system, though the example implementations are not limited in this respect.

In an eighth aspect of the second example system, the channel logic is configured to review the profile associated with a WiFi technology to determine the designated channel that the WiFi technology is to use at the location. In accordance with the eighth aspect, the connection logic is configured to cause the source device to initiate the peer-to-peer session using the designated channel based at least in part on a determination that the WiFi technology is to use the designated channel at the location. The eighth aspect of the second example system may be implemented in combination with the first, second, third, fourth, fifth, sixth, and/or seventh aspect of the second example system, though the example implementations are not limited in this respect.

In a first example method, a designated wireless technology profile is identified from a plurality of wireless technology profiles to use at a designated location. A designated channel is selected from a plurality of available channels based at least in part on the designated wireless technology profile indicating that the designated channel is associated with a wireless technology. A peer-to-peer session, which corresponds to a peer-to-peer technology that is different from the wireless technology, is initiated using the designated channel in response to selecting the designated channel from the plurality of available channels.

In a first aspect of the first example method, selecting the designated channel comprises selecting the designated channel, in lieu of a default channel that is associated with the peer-to-peer technology, based at least in part on the designated wireless technology profile indicating that the designated channel is associated with the wireless technology.

In a second aspect of the first example method, the first example method further comprises causing the designated wireless technology profile to indicate that the designated channel is associated with the wireless technology based at least in part on a user preference indicating that the designated channel is to be used by the wireless technology at the designated location. The second aspect of the first example method may be implemented in combination with the first aspect of the first example method, though the example implementations are not limited in this respect.

In a third aspect of the first example method, the first example method further comprises causing the designated wireless technology profile to indicate that the designated channel is associated with the wireless technology based at least in part on a determination that a frequency with which the designated channel is used by the wireless technology at the designated location is greater than or equal to a frequency with which each other channel in the plurality of available channels is used by the wireless technology at the designated location. The third aspect of the first example method may be implemented in combination with the first and/or second aspect of the first example method, though the example implementations are not limited in this respect.

In a fourth aspect of the first example method, the plurality of available channels includes a blacklisted channel that is specified in a blacklist. In accordance with the fourth aspect, each blacklisted channel that is specified in the blacklist is precluded from being used by the wireless technology at the designated location. In further accordance with the fourth aspect, the blacklisted channel is used more frequently than the designated channel by the wireless technology at the designated location. In further accordance with the fourth aspect, the first example method further comprises causing the designated wireless technology profile to indicate that the designated channel is associated with the wireless technology based at least in part on the blacklisted channel being specified in the blacklist. The fourth aspect of the first example method may be implemented in combination with the first, second, and/or third aspect of the first example method, though the example implementations are not limited in this respect.

In a fifth aspect of the first example method, the first example method further comprises monitoring activity of a user with regard to one or more sessions that are established to utilize the wireless technology at the location. In accordance with the fifth aspect, the first example method further comprises causing the designated wireless technology profile to indicate that the designated channel is associated with the wireless technology based at least in part on the activity of the user including a user-initiated switching activity that causes switching from an initially selected channel to the designated channel for at least one of the one or more sessions. The fifth aspect of the first example method may be implemented in combination with the first, second, third, and/or fourth aspect of the first example method, though the example implementations are not limited in this respect.

In a sixth aspect of the first example method, selecting the designated channel comprises selecting the designated channel from the plurality of available channels based at least in part on the designated wireless technology profile indicating that the designated channel is associated with a cellular technology. The sixth aspect of the first example method may be implemented in combination with the first, second, third, fourth, and/or fifth aspect of the first example method, though the example implementations are not limited in this respect.

In a seventh aspect of the first example method, selecting the designated channel comprises selecting the designated channel from the plurality of available channels based at least in part on the designated wireless technology profile indicating that the designated channel is associated with a global positioning system (GPS) technology. The seventh aspect of the first example method may be implemented in combination with the first, second, third, fourth, fifth, and/or sixth aspect of the first example method, though the example implementations are not limited in this respect.

In an eighth aspect of the first example method, selecting the designated channel comprises selecting the designated channel from the plurality of available channels based at least in part on the designated wireless technology profile indicating that the designated channel is associated with a WiFi technology. The eighth aspect of the first example method may be implemented in combination with the first, second, third, fourth, fifth, sixth, and/or seventh aspect of the first example method, though the example implementations are not limited in this respect.

In a second example method, a location of a source device is determined. A profile associated with a wireless technology is reviewed to determine a designated channel that the wireless technology is to use at the location. A request to initiate a peer-to-peer session, which corresponds to a peer-to-peer technology that is different from the wireless technology, is received. The source device is caused to initiate the peer-to-peer session using the designated channel based at least in part on a determination that the wireless technology is to use the designated channel at the location, in response to receiving the request.

In a first aspect of the second example method, causing the source device to initiate the peer-to-peer session comprises causing the source device to initiate the peer-to-peer session using the designated channel in lieu of a default channel that is associated with the peer-to-peer technology based at least in part on a determination that the wireless technology is to use the designated channel at the location, in response to receiving the request.

In a second aspect of the second example method, the second example method further comprises causing the profile to indicate that the wireless technology is to use the designated channel at the location based at least in part on a user preference indicating that the wireless technology is to use the designated channel at the location. The second aspect of the second example method may be implemented in combination with the first aspect of the second example method, though the example implementations are not limited in this respect.

In a third aspect of the second example method, the second example method further comprises causing the profile to indicate that the wireless technology is to use the designated channel at the location based at least in part on a determination that a frequency with which the wireless technology uses the designated channel at the location is greater than or equal to a frequency with which the wireless technology uses each other channel at the location. The third aspect of the second example method may be implemented in combination with the first and/or second aspect of the second example method, though the example implementations are not limited in this respect.

In a fourth aspect of the second example method, a blacklisted channel is specified in a blacklist. In accordance with the fourth aspect, the blacklist indicates that the wireless technology is not to use the blacklisted channel at the location. In further accordance with the fourth aspect, the blacklisted channel is used more frequently than the designated channel by the wireless technology at the location. In further accordance with the fourth aspect, the second example method further comprises causing the profile to indicate that the wireless technology is to use the designated channel at the location based at least in part on the blacklisted channel being specified in the blacklist. The fourth aspect of the second example method may be implemented in combination with the first, second, and/or third aspect of the second example method, though the example implementations are not limited in this respect.

In a fifth aspect of the second example method, the second example method further comprises monitoring activity of a user of the device with regard to one or more sessions that are initiated for the wireless technology at the location. In accordance with the fifth aspect, the second example method further comprises causing the profile to indicate that the wireless technology is to use the designated channel at the location based at least in part on a determination that the user causes at least one of the one or more sessions to be reconfigured such that the respective session switches from using an initially selected channel to using the designated channel. The fifth aspect of the second example method may be implemented in combination with the first, second, third, and/or fourth aspect of the second example method, though the example implementations are not limited in this respect.

In a sixth aspect of the second example method, reviewing the profile comprises reviewing the profile associated with a cellular technology to determine the designated channel that the cellular technology is to use at the location. In accordance with the sixth aspect, causing the source device to initiate the peer-to-peer session comprises causing the source device to initiate the peer-to-peer session using the designated channel based at least in part on a determination that the cellular technology is to use the designated channel at the location, in response to receiving the request. The sixth aspect of the second example method may be implemented in combination with the first, second, third, fourth, and/or fifth aspect of the second example method, though the example implementations are not limited in this respect.

In a seventh aspect of the second example method, reviewing the profile comprises reviewing the profile associated with a global positioning system (GPS) technology to determine the designated channel that the GPS technology is to use at the location. In accordance with the seventh aspect, causing the source device to initiate the peer-to-peer session comprises causing the source device to initiate the peer-to-peer session using the designated channel based at least in part on a determination that the GPS technology is to use the designated channel at the location, in response to receiving the request. The seventh aspect of the second example method may be implemented in combination with the first, second, third, fourth, fifth, and/or sixth aspect of the second example method, though the example implementations are not limited in this respect.

In an eighth aspect of the second example method, reviewing the profile comprises reviewing the profile associated with a WiFi technology to determine the designated channel that the WiFi technology is to use at the location. In accordance with the eighth aspect, causing the source device to initiate the peer-to-peer session comprises causing the source device to initiate the peer-to-peer session using the designated channel based at least in part on a determination that the WiFi technology is to use the designated channel at the location, in response to receiving the request. The eighth aspect of the second example method may be implemented in combination with the first, second, third, fourth, fifth, sixth, and/or seventh aspect of the second example method, though the example implementations are not limited in this respect.

A first example computer program product comprising a computer-readable storage medium having instructions recorded thereon for enabling a processor-based system to perform a location-based determination of a channel for initiating a peer-to-peer session. The instructions comprise first instructions for enabling the processor-based system to identify a designated wireless technology profile from a plurality of wireless technology profiles to use at a designated location. The instructions further comprise second instructions for enabling the processor-based system to select a designated channel from a plurality of available channels based at least in part on the designated wireless technology profile indicating that the designated channel is associated with a wireless technology. The instructions further comprise third instructions for enabling the processor-based system to initiate a peer-to-peer session, which corresponds to a peer-to-peer technology that is different from the wireless technology, using the designated channel in response to the designated channel being selected from the plurality of available channels.

A second example computer program product comprising a computer-readable storage medium having instructions recorded thereon for enabling a processor-based system to perform a location-based determination of a channel for initiating a peer-to-peer session. The instructions comprise first instructions for enabling the processor-based system to determine a location of a source device. The instructions further comprise second instructions for enabling the processor-based system to review a profile associated with a wireless technology to determine a designated channel that the wireless technology is to use at the location. The instructions further comprise third instructions for enabling the processor-based system to cause the source device to initiate the peer-to-peer session, which corresponds to a peer-to-peer technology that is different from the wireless technology, using the designated channel based at least in part on a determination that the wireless technology is to use the designated channel at the location, in response to receipt of a request to initiate the peer-to-peer session.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:
   memory; and
   one or more processors coupled to the memory and configured to:
   identify a designated wireless technology profile from a plurality of wireless technology profiles to use at a designated location;
   select a designated channel from a plurality of available channels based at least in part on the designated wireless technology profile indicating that the designated channel is associated with a wireless technology; and
   initiate a peer-to-peer session, which corresponds to a peer-to-peer technology that is different from the wireless technology, using the designated channel in response to the designated channel being selected from the plurality of available channels.

2. The system of claim 1, wherein the one or more processors are configured to select the designated channel, in lieu of a default channel that is associated with the peer-to-peer technology, based at least in part on the designated wireless technology profile indicating that the designated channel is associated with the wireless technology.

3. The system of claim 1, wherein the one or more processors are further configured to cause the designated wireless technology profile to indicate that the designated channel is associated with the wireless technology based at least in part on a user preference indicating that the designated channel is to be used by the wireless technology at the designated location.

4. The system of claim 1, wherein the one or more processors are further configured to cause the designated wireless technology profile to indicate that the designated channel is associated with the wireless technology based at least in part on a determination that a frequency with which the designated channel is used by the wireless technology at the designated location is greater than or equal to a frequency with which each other channel in the plurality of available channels is used by the wireless technology at the designated location.

5. The system of claim 1, wherein the plurality of available channels includes a blacklisted channel that is specified in a blacklist;
   wherein each blacklisted channel that is specified in the blacklist is precluded from being used by the wireless technology at the designated location;
   wherein the blacklisted channel is used more frequently than the designated channel by the wireless technology at the designated location; and
   wherein the one or more processors are further configured to cause the designated wireless technology profile to indicate that the designated channel is associated with the wireless technology based at least in part on the blacklisted channel being specified in the blacklist.

6. The system of claim 1, wherein the one or more processors are further configured to:
   monitor activity of a user with regard to one or more sessions that are established to utilize the wireless technology at the location; and
   cause the designated wireless technology profile to indicate that the designated channel is associated with the wireless technology based at least in part on the activity of the user including a user-initiated switching activity that causes switching from an initially selected channel to the designated channel for at least one of the one or more sessions.

7. The system of claim 1, wherein the one or more processors are configured to select the designated channel from the plurality of available channels based at least in part on the designated wireless technology profile indicating that the designated channel is associated with a cellular technology.

8. The system of claim 1, wherein the one or more processors are configured to select the designated channel from the plurality of available channels based at least in part on the designated wireless technology profile indicating that the designated channel is associated with a global positioning system (GPS) technology.

9. The system of claim 1, wherein the one or more processors are configured to select the designated channel from the plurality of available channels based at least in part on the designated wireless technology profile indicating that the designated channel is associated with a WiFi technology.

10. A system comprising:
    memory; and
    one or more processors coupled to the memory and configured to:
    determine a location of a source device;
    review a profile associated with a wireless technology to determine a designated channel that the wireless technology is to use at the location; and
    cause the source device to initiate a peer-to-peer session, which corresponds to a peer-to-peer technology that is different from the wireless technology, using the designated channel based at least in part on a determination that the wireless technology is to use the designated channel at the location, in response to receipt of a request to initiate the peer-to-peer session.

11. The system of claim 10, wherein the one or more processors are configured to cause the source device to initiate the peer-to-peer session using the designated channel in lieu of a default channel that is associated with the peer-to-peer technology based at least in part on a determination that the wireless technology is to use the designated channel at the location.

12. The system of claim 10, wherein the one or more processors are further configured to cause the profile to indicate that the wireless technology is to use the designated channel at the location based at least in part on a user preference indicating that the wireless technology is to use the designated channel at the location.

13. The system of claim 10, wherein the one or more processors are further configured to cause the profile to indicate that the wireless technology is to use the designated channel at the location based at least in part on a determination that a frequency with which the wireless technology uses the designated channel at the location is greater than or equal to a frequency with which the wireless technology uses each other channel at the location.

14. The system of claim 10, wherein a blacklisted channel is specified in a blacklist;
    wherein the blacklist indicates that the wireless technology is not to use the blacklisted channel at the location;
    wherein the blacklisted channel is used more frequently than the designated channel by the wireless technology at the location; and
    wherein the one or more processors are further configured to cause the profile to indicate that the wireless technology is to use the designated channel at the location based at least in part on the blacklisted channel being specified in the blacklist.

15. The system of claim 10, wherein the one or more processors are further configured to:
monitor activity of a user of the device with regard to one or more sessions that are initiated for the wireless technology at the location; and
cause the profile to indicate that the wireless technology is to use the designated channel at the location based at least in part on a determination that the user causes at least one of the one or more sessions to be reconfigured such that the respective session switches from using an initially selected channel to using the designated channel.

16. The system of claim 10, wherein the one or more processors are configured to:
review the profile associated with a cellular technology to determine the designated channel that the cellular technology is to use at the location; and
cause the source device to initiate the peer-to-peer session using the designated channel based at least in part on a determination that the cellular technology is to use the designated channel at the location.

17. The system of claim 10, wherein the one or more processors are configured to:
review the profile associated with a global positioning system (GPS) technology to determine the designated channel that the GPS technology is to use at the location; and
cause the source device to initiate the peer-to-peer session using the designated channel based at least in part on a determination that the GPS technology is to use the designated channel at the location.

18. The system of claim 10, wherein the one or more processors are configured to:
review the profile associated with a WiFi technology to determine the designated channel that the WiFi technology is to use at the location; and
cause the source device to initiate the peer-to-peer session using the designated channel based at least in part on a determination that the WiFi technology is to use the designated channel at the location.

19. A method comprising:
identifying a designated wireless technology profile from a plurality of wireless technology profiles to use at a designated location;
selecting a designated channel from a plurality of available channels based at least in part on the designated wireless technology profile indicating that the designated channel is associated with a wireless technology; and
initiating a peer-to-peer session, which corresponds to a peer-to-peer technology that is different from the wireless technology, using the designated channel in response to selecting the designated channel from the plurality of available channels.

20. The method of claim 19, wherein selecting the designated channel comprises:
selecting the designated channel, in lieu of a default channel that is associated with the peer-to-peer technology, based at least in part on the designated wireless technology profile indicating that the designated channel is associated with the wireless technology.

* * * * *